No. 764,453.

Patented July 5, 1904.

UNITED STATES PATENT OFFICE.

GUSTAV GEISSLER, SR., AND GUSTAV GEISSLER, JR., OF GRATZ, AUSTRIA-HUNGARY.

PROCESS OF MANUFACTURING CEMENT.

SPECIFICATION forming part of Letters Patent No. 764,453, dated July 5, 1904.

Application filed May 18, 1903. Serial No. 157,719. (No specimens.)

*To all whom it may concern:*

Be it known that we, GUSTAV GEISSLER, Sr., and GUSTAV GEISSLER, Jr., subjects of the Emperor of Germany, residing at Gratz, in the Province of Styria, in the Empire of Austria-Hungary, have invented certain new and useful Improvements in Processes of Manufacturing Cement; and we do hereby declare the following to be a full, clear, and exact description of the invention, such as will enable others skilled in the art to which it appertains to make and use the same.

This invention relates to an improved process for the manufacture of cement, differing essentially from the processes heretofore employed in this particular art and effecting substantial commercial economies by the reduction of fuel and the cost of preparation, promotes the development of the hydraulic qualities of the cement, and the duration of the smelting process is considerably reduced, at least to about fifty to sixty per cent. of the time generally required in the ordinary process when blast-air is used.

The manner of carrying out our invention is as follows: The solid mixture of raw materials or their constituents such as required for the production of a good serviceable cement are totally smelted in a suitable furnace without being previously ground or heated or otherwise treated, which transforms the substance so that a liquid homogeneous mass is produced. While the fusing or smelting process is being performed, oxygen of as pure a quality as possible is introduced, consequently obtaining a very high degree of heat, (2,500° to 3,000° centigrade,) which considerably increases the development of the hydraulic qualities of the cement. Furthermore, the duration of the smelting process is greatly reduced, and the fuel required for such operation is completely utilized. After the mixture has been reduced to a molten mass it is introduced in cold water, thereby granulating it.

It has been observed that when blast-air is employed while the materials are being smelted the nitrogen which always exists in the atmospheric air has a detrimental effect on the cement; but such objection is overcome when pure oxygen is used.

Having thus fully described our invention, what we claim as new, and desire to secure by Letters Patent, is—

The process of manufacture of cement, which consists in smelting the mixture of the raw materials with the admission of oxygen of as pure a quality as possible and subsequent granulation of the molten product, substantially as described.

In testimony that we claim the foregoing as our invention we have signed our names in presence of two subscribing witnesses.

GUSTAV GEISSLER, SEN.
GUSTAV GEISSLER, JUN.

Witnesses:
JOSEF RUBARCH,
ALVESTO S. HOGUE.